J. W. HORNSEY.
METHOD OF LEACHING ORES AND THE LIKE.
APPLICATION FILED NOV. 13, 1917.

1,398,723.

Patented Nov. 29, 1921.
5 SHEETS—SHEET 1.

INVENTOR:
John W. Hornsey,
BY
Fennie, Davis, Marvin & Edwards
ATTORNEYS.

J. W. HORNSEY.
METHOD OF LEACHING ORES AND THE LIKE.
APPLICATION FILED NOV. 13, 1917.
1,398,723.
Patented Nov. 29, 1921.
5 SHEETS—SHEET 2.
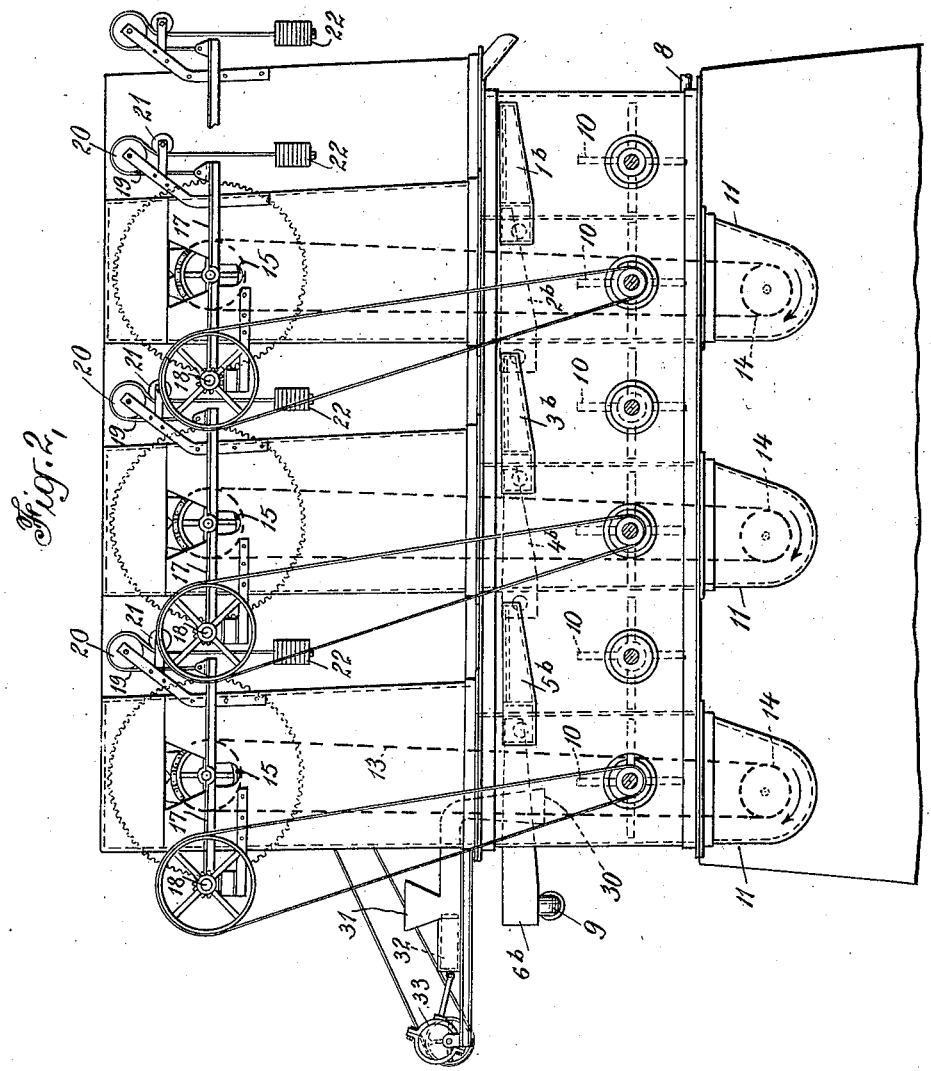
INVENTOR:
John W. Hornsey,
BY
Pennie, Davis, Marvin & Edmonds
ATTORNEYS.

J. W. HORNSEY.
METHOD OF LEACHING ORES AND THE LIKE.
APPLICATION FILED NOV. 13, 1917.
1,398,723.
Patented Nov. 29, 1921.
5 SHEETS—SHEET 3.
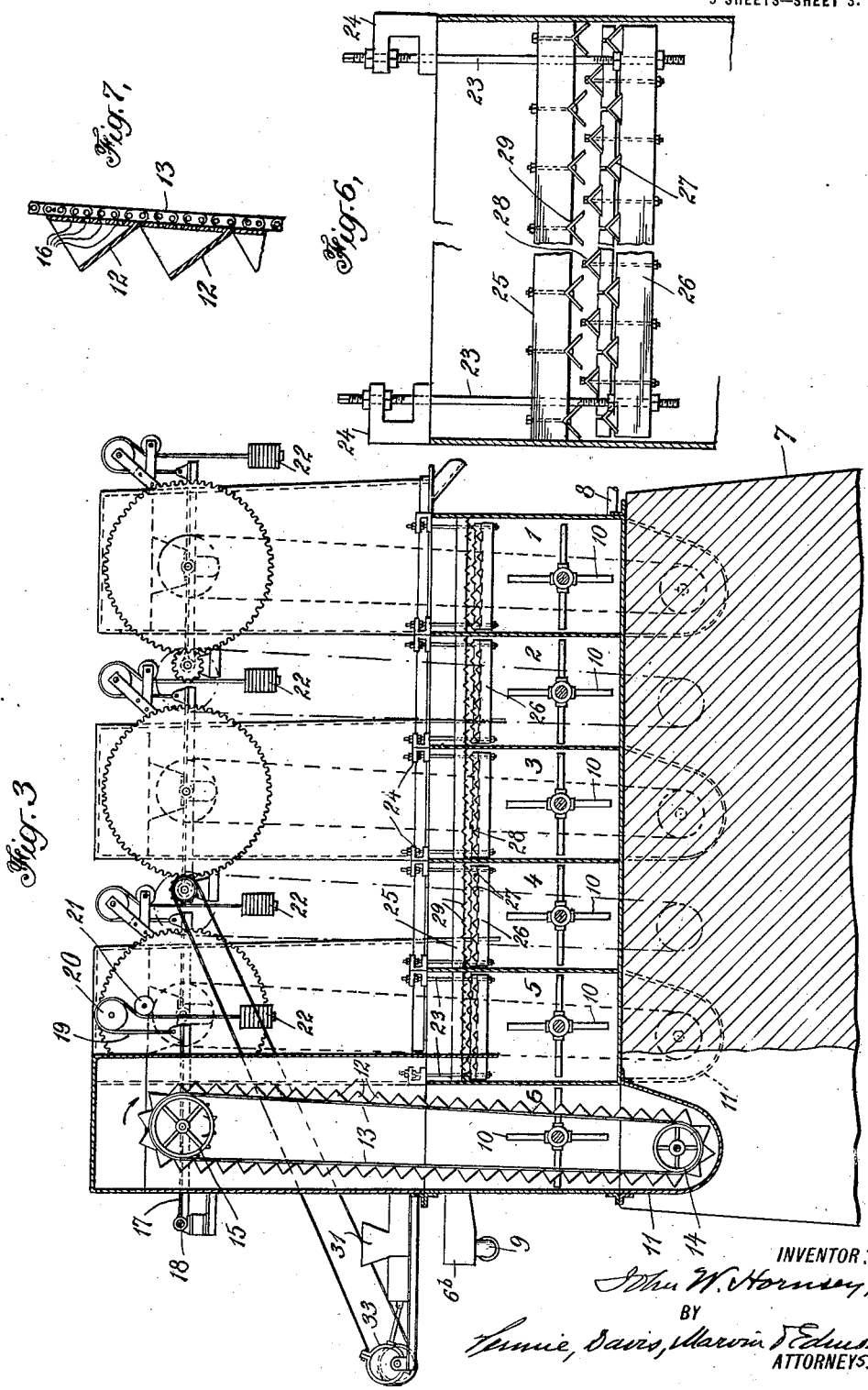

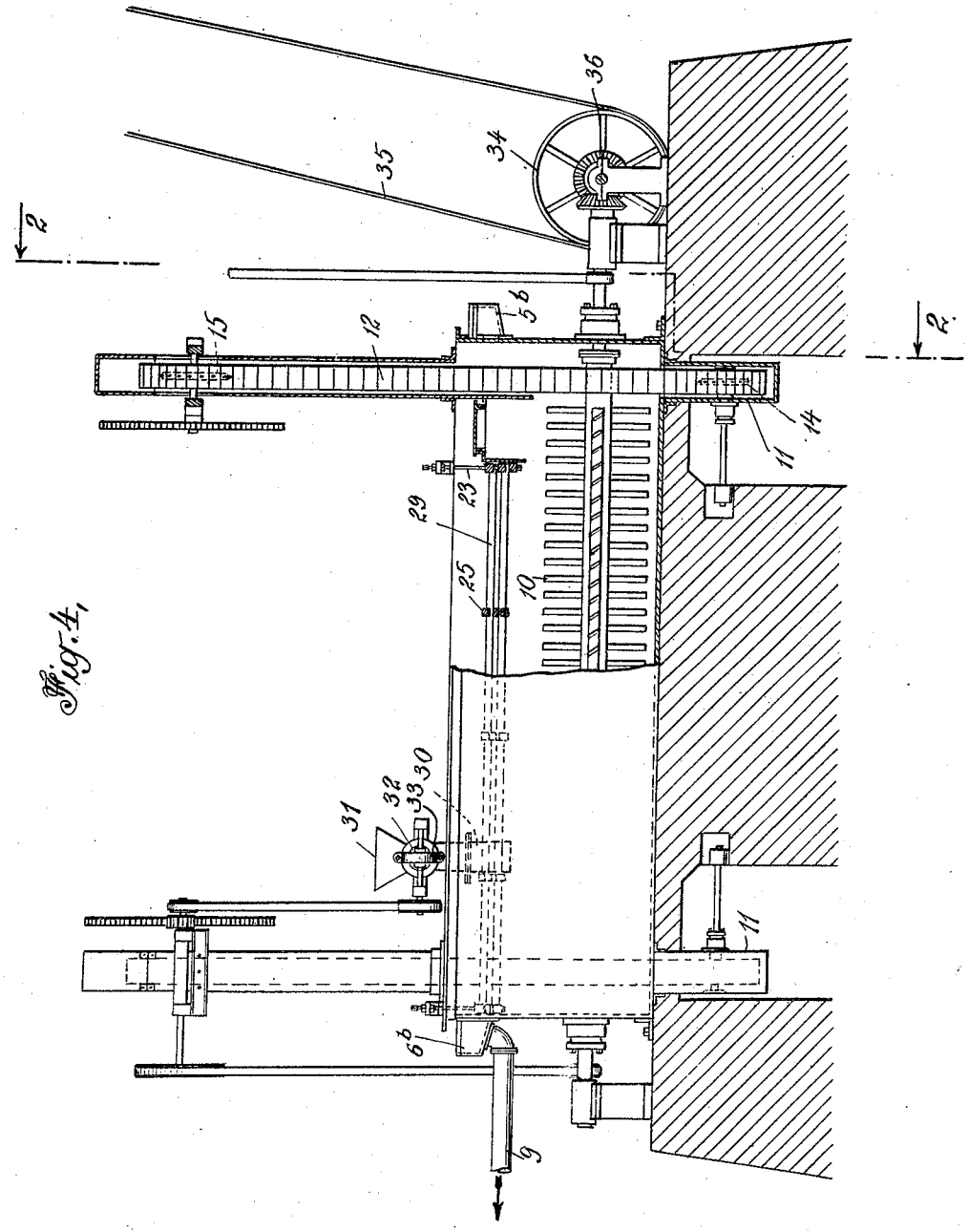

J. W. HORNSEY.
METHOD OF LEACHING ORES AND THE LIKE.
APPLICATION FILED NOV. 13, 1917.
1,398,723.
Patented Nov. 29, 1921.
5 SHEETS—SHEET 5.
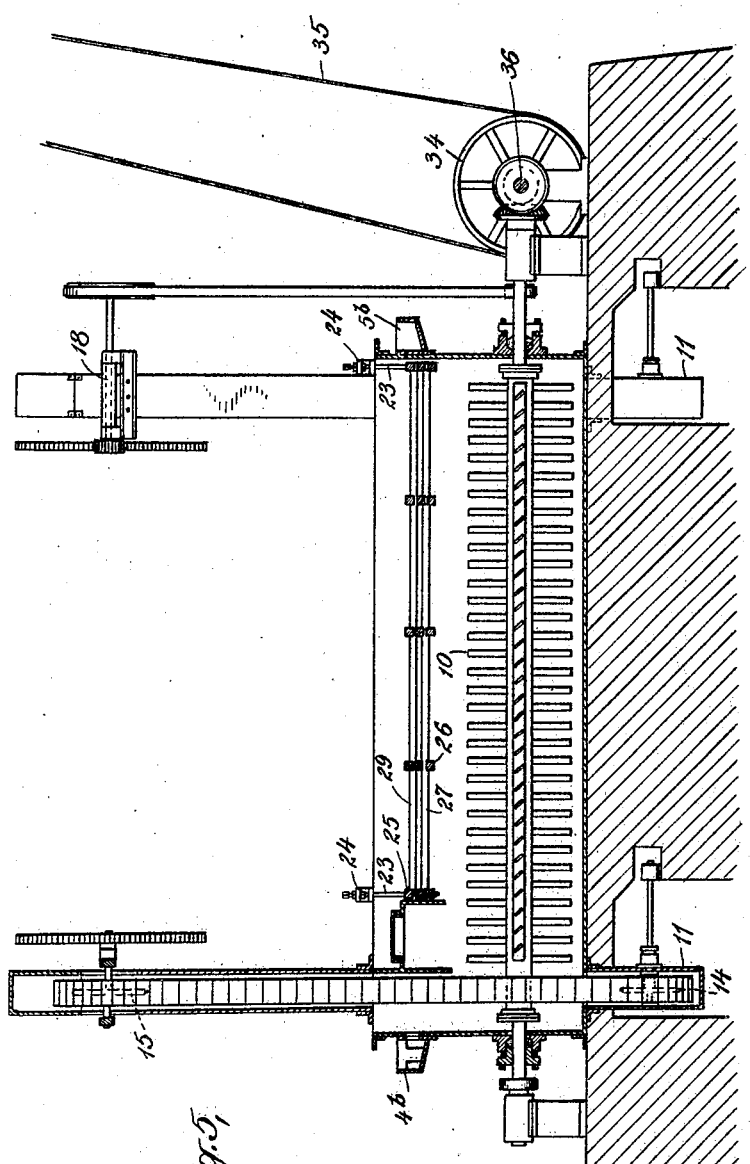
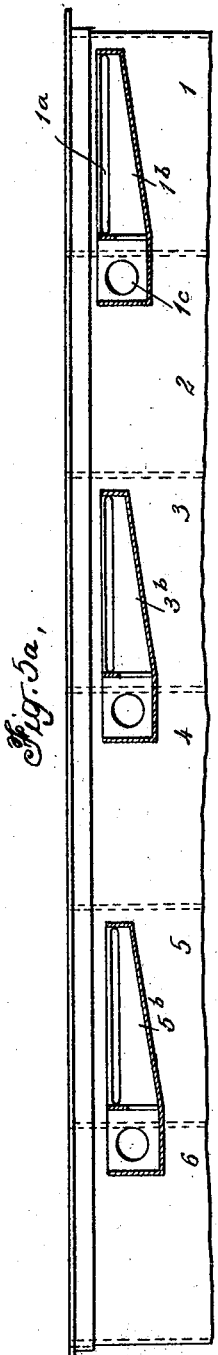
INVENTOR:
John W. Hornsey,
BY
ATTORNEYS.

UNITED STATES PATENT OFFICE.

JOHN W. HORNSEY, OF SUMMIT, NEW JERSEY.

METHOD OF LEACHING ORES AND THE LIKE.

1,398,723. Specification of Letters Patent. Patented Nov. 29, 1921.

Application filed November 13, 1917. Serial No. 201,775.

*To all whom it may concern:*

Be it known that I, JOHN W. HORNSEY, a citizen of the United States, residing at Summit, in the county of Union, State of New Jersey, have invented certain new and useful Improvements in Methods of Leaching Ores and the like; and I do hereby declare the following to be a full, clear, and exact description of the invention, such as will enable others skilled in the art to which it appertains to make and use the same.

The present invention relates to the leaching of ores and like solid materials containing soluble constituents adapted to be dissolved out therefrom by means of water (acidulated or not) or any other suitable leaching liquid.

The invention is based upon the discovery that the leaching operation can be extraordinarily facilitated by introducing the material to be leached into the lower portion of a body of leaching liquid, subjecting the material therein to such violent agitation as will maintain its particles, in their substantial entirety, in suspension, and maintaining the suspended particles in relatively close relation to the agitating devices by providing a series of grids, barriers, or the like, interposed between the zone of suspended and agitated particles and the upper portion of the body of leaching liquid. The agitating devices are, in the preferred embodiment of the invention, of such a character as to progressively feed the material to be leached through the zone in which the particles are maintained in agitation and suspension while a relatively clear zone of progressively increasing density of solution is maintained above the interposed screening grids or barriers. In practice, it will usually be preferred to supply a constant but relatively small flow of leaching liquor to the apparatus, so that there may be a corresponding continuous outflow of the solution obtained as a result of the leaching operation, the degree of concentration of the solution being determined by suitably proportioning the quantity of material to be leached and its rate of flow through the leaching liquid to the rate of flow of the leaching liquid itself.

The desired strength of the solution discharged from the leaching apparatus will depend usually upon the method to be employed for the recovery of the dissolved constituent of the leached material. If the dissolved constituent is to be recovered in a solid state by evaporation, or in a liquid state by concentration, it will suffice to obtain a correspondingly moderate degree of concentration in the leaching apparatus. Where, on the other hand, the dissolved constituent is to be recovered by crystallization, it will usually be preferred to obtain in the leaching apparatus a solution of appropriately high concentration, amounting, in some cases, almost, if not quite, to saturation.

In carrying out the invention, it will be desirable and feasible to sub-divide the leaching liquid into a plurality of separate bodies, contained in receptacles or containers which discharge successively the one into the other, so that a constant flow of the leaching liquor will be obtained, beginning at the initial member of the series and terminating in an overflow at the final member thereof. So also, the supply of the material to be leached is preferably progressive and in a counter-direction to the flow of the leaching liquor; that is to say, the material to be leached is first admitted to the final member of the series of separate bodies of leaching liquor and is then conveyed successively through the other bodies of leaching liquor throughout the series and takes its exit finally from the initial body of leaching liquor. In its passage from one receptacle or container to the next in the series, the material to be leached preferably enters into a settling well which may constitute the boot of an elevator and from which it is supplied to the next adjoining body of leaching liquor, and in such manner, as hereinbefore indicated, as to enter the lower portion or suspension zone thereof, as will hereinafter more fully appear.

In the accompanying drawing,—

Fig. 2 represents an end elevation thereof;

Fig. 3 represents a transverse section on a plane indicated by the line 3—3 of Fig. 1.

Fig. 4 represents a view partly in elevation and partly in section on a plane indicated by the line 4—4 of Fig. 1.

Fig. 5 represents a sectional view on a plane indicated by the line 5—5 of Fig. 1.

Figure 1:
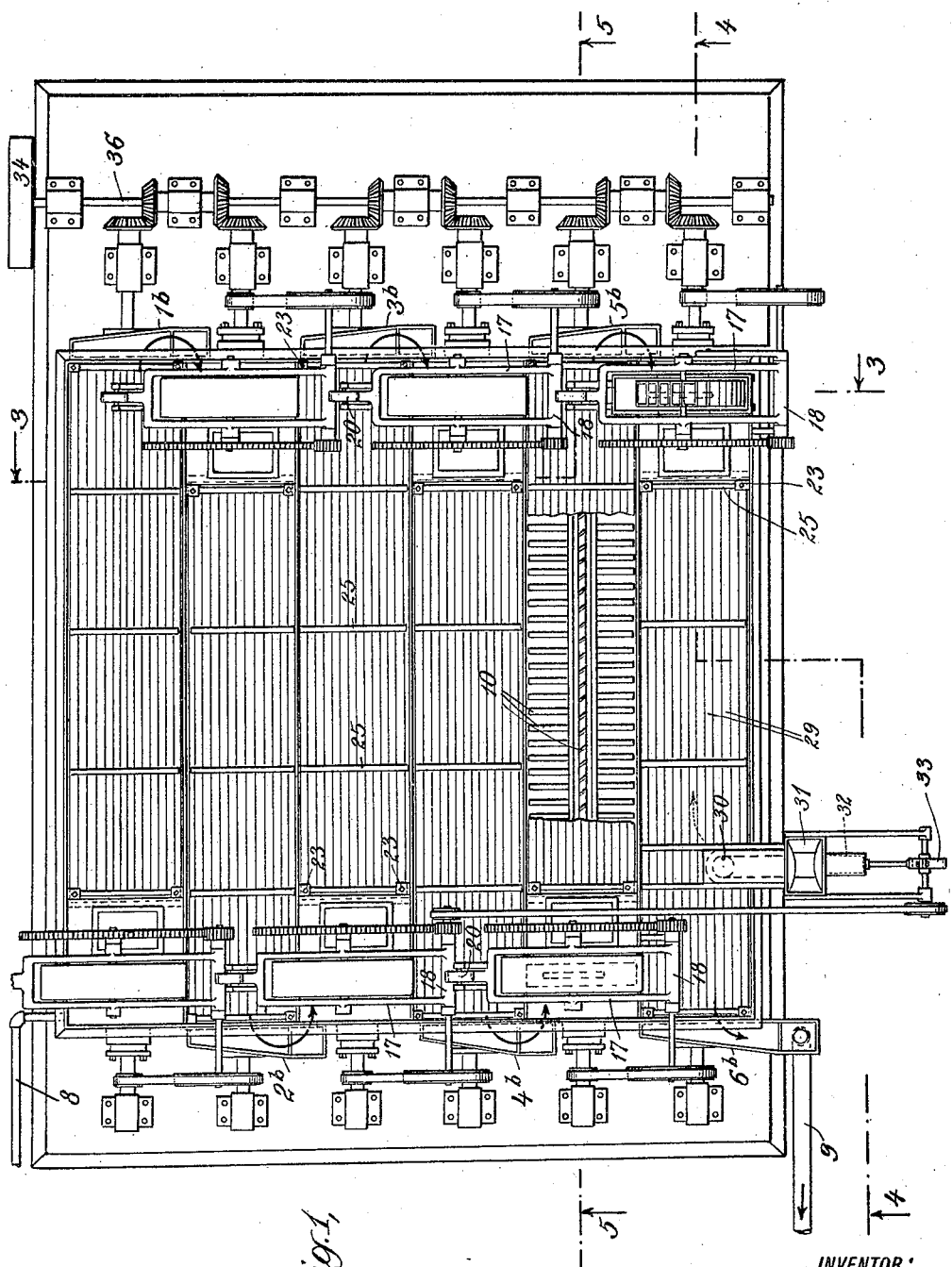
Figure 1 represents a plan view, partly in section, of an apparatus exemplifying the construction and mode of operation of my invention.

Fig. 5ᵃ indicates a partial end elevation, showing the overflow boxes in section;

Fig. 6 represents, on a somewhat enlarged scale, the construction and mode of adjustment of the grids or barriers, hereinbefore referred to.

Fig. 7 represents in section the preferred construction of the elevator buckets.

Similar numerals of reference indicate similar parts throughout the several views.

Referring to the drawings, it will be noted that a series of receptacles 1, 2, 3, 4, 5, and 6, are provided, for the reception of the leaching liquid, these receptacles discharging the one into the other, from #1 to #6 of the series. The number of receptacles thus provided and their dimentions will depend upon the character of the particular leaching operation or operations proposed and may be greater or less than the number illustrated in the drawings, as will be readily understood. In fact, as will hereinafter appear, some of the most important steps of the operation may be practised either alone or in conjunction with other steps thereof in a single one of the receptacles.

The leaching receptacles will usually, as shown in the drawings, constitute compartments of a unitary structure which may be mounted upon any suitable base, floor or foundation 7 suitable for the purpose. Receptacle 1 is provided with an overflow as, for instance, the slot 1ᵃ, whereby the leach liquor from the receptacle 1 is discharged into the overflow box 1ᵇ. From the box 1ᵇ the leach liquor passes through the opening 1ᶜ into compartment #2. Thence, in like manner, the leaching liquor passes from compartment #2 through a similar slot into the overflow box 2ᵇ; thence through the compartment #3 to the overflow box 3ᵇ, thence through the compartment #4 to the overflow box 4ᵇ; thence through compartment #5 to the overflow box 5ᵇ; and finally, through the compartment #6 to the overflow box 6ᵇ. The discharge of the leach liquor from one compartment to the final compartment of the series is indicated by the arrows in Fig. 1, the leaching liquor being supplied, for instance, through the inlet pipe 8 and having its exit through the pipe 9. In order to prevent any diffusion of the salts in solution from one compartment to the preceding one of the series, the overflow slots or weirs are 1 inch lower in compartment #2 than in compartment #1, and said slots or weirs correspondingly drop 1 inch as the leaching liquor passes on through compartments Nos. 3, 4, 5 and 6.

It will be understood that the leaching liquor admitted through the inlet pipe 8 may be and preferably will be wash water, so that the solid material to be leached may issue from the final compartment of the series substantially exhausted of its soluble constituents. The ore or other material to be leached passes through the series of leaching receptacles or compartments in a direction opposite to that of the leaching liquor; that is to say, entering at compartment #6, it is progressed in succession through said compartment #6 and through compartments Nos. 5, 4, 3, 2 and 1, respectively, finally passing from the compartment #1, substantially deprived, to the predetermined degree, of its leachable constituents. The relative feed in one direction of the solids to be leached, and, in the other direction, of the leaching liquor are so proportioned the one to the other, when the apparatus is operated to the best advantage, so that a solution as nearly saturated as possible shall issue from compartment 6 and a solid deprived as far as feasible of its leachable or soluble material shall be discharged from the compartment 1.

Each compartment of the series is provided with means for violently agitating the solid material so as to keep at least the greater part of it in suspension in the leaching liquid, while simultaneously feeding the solid material through said compartment. Suitable apparatus for this purpose will consist of a series of blades having such an inclination that when rotated rapidly, they will tend to maintain the solids, or the major part thereof, in suspension in the leaching liquid, but will nevertheless move the solids onward toward the end of the compartment and will discharge them continuously into a settling well 11,—one of which is provided for each of the several compartments. This settling well likewise constitutes the boot of an elevator, whose buckets 12 (see Fig. 7) are attached to a sprocket chain 13. The sprocket chain 13 passes around the idler 14 located in the boot of the elevator and is driven from the sprocket gear 15, in any suitable manner, as, for instance, by the driving gear shown. The bucket elevators are so proportioned, as regards speed, number and size of buckets, that they will normally carry over from one compartment to the next of the series, a thickened mass of material containing very little moisture and entirely too thick to flow. However, to provide for any variation in either the rate of flow of the solids through the apparatus, or for any variation of the soluble constituents in said solids, each bucket is preferably provided with a row of holes 16 in the back, this row being vertical. In those instances where the thickened material in the bottom of the buckets will bridge over openings in the bucket, whatever milky fluid may exist on the top will flow out through the upper openings of the bucket and will thus return to the compartment from which the bucket might otherwise take it.

In order to maintain the sprocket chain appropriately taut, the sprocket gear 15 may conveniently be mounted in a bracket 17 adapted to turn upon a center 18. The bracket 17 is provided at its free end with a perforated lug from which a strap 19 passes over idlers 20, 21, and terminates in a weighted end 22, the whole constituting an automatic take-up device to compensate for any slack in the sprocket chain.

I have hereinbefore referred to the desirability of providing means for violently agitating the ore or other solids to be leached, on the passage of said solids through the leaching compartments. I have found that where the mixture is merely stirred in passing through the leaching liquor, or merely drawn through the leaching liquor, the results are vastly different from those attained by the practice of my invention, wherein in the zone through which the ore or the like is passed, the ore is subjected to the beating action of the paddles so that the individual particles of the ore are repeatedly separated and thus are brought into contact with an enormously larger surface of the leaching solution. This violent agitation not only maintains the major part of the particles in suspension, but propels them back and forth through the suspension zone, while still tending to carry them onward toward the discharge ends of the several compartments and into the settling wells or elevator boots. Accordingly, the capacity and efficiency of the operation is assured by the resultant intimacy of contact between the reacting substances which, in this case, are the solvents employed and the soluble matter contained in the ore or the like; and also, by the amount of surface exposed to the action of the solvent.

The intimacy of contact between the leaching solution and the soluble matter in the ore or other solid material to be leached, is dependent upon the amount of the leaching liquor with which any given particle of the soluble matter will come into contact while passing through the apparatus. Consequently, the violent agitation incident to the practice of my invention whereby the paddles repeatedly separate the particles from each other and by impact and propulsion force them to travel backward and forward through the leaching liquor in a path transverse to its general direction of flow through the apparatus, results in so high a measure of efficiency as to make it feasible to obtain final solutions of extremely high concentration, amounting, in some instances, to practically complete saturation. In fact, I may make special use of this high efficiency of the apparatus, by heating the solution either externally, (as, for instance, by steam-jacketing the apparatus) or by admitting superheated steam directly into the leaching liquid in the several compartments; so that, upon the issuing of a highly heated and saturated or nearly saturated leach liquor from the terminal compartment of the series, it will be feasible to cool said liquor and crystallize out a proportionate quantity of its salts, whereupon the cooled mother liquor may be, if desired, returned to the apparatus (say by admitting it in compartment #2 of the series).

It is of great importance to the efficient operation of the leaching process, that the zone in which the paddles operate and which I have designated as the zone of suspension of the particles, be maintained substantially separate from the zone of clear solution above; so that the solution overflowing from one compartment to another shall be correspondingly clear, rather than to carry in suspension a considerable percentage of solids giving a "milky" appearance.

Accordingly, to obtain the desired separation between the lower zone of suspension and the upper zone of clear solution, I interpose between the two zones, a barrier, of such a character as to interfere with or block the tendency of the solid particles to rise into the upper zone under the propelling or beating action of the paddles. I have found particularly suitable for this purpose, the grid structure shown in the drawings, which structure is typical of many others that might be employed for the same purpose.

The particular grid structure shown in the drawings is suspended by rods 23 from the sustaining brackets 24, the upper ends of the rods being threaded as shown and provided with adjusting nuts. The rods 23 are likewise threaded at their lower portions, where, as indicated more fully in Fig. 6, they pass through cross-pieces 25 and 26, adjusting nuts being provided for the purpose of establishing the appropriate spacing between said cross-pieces. The lower cross-piece sustains a series of angle irons 27. Above this series of angle irons 27 is supported a series of angle irons 28, and the cross-piece 25 sustains a still further series of angle irons 29. The three series of angle irons 27, 28 and 29 occupy a staggered position with respect to each other, so as to constitute an effective grid immediately above the paddles whose rotation maintains the particles in suspension, so that any particles which tend to be propelled into the zone above the grid are met by the grid barrier, and, for the most part, are prevented from rising into the clear zone above. The sloping upper surfaces of the angle irons facilitate the return of any particles which may pass the grid, and the grid as a whole keeps the solid material in closer relationship to the rotating paddles thereby correspondingly enhancing the effectiveness of the paddles in separating the particles from each other and in bringing them into intimate contact with the leaching liquid.

It is further advantageous to maintain the desired clearness of the solution above the grids or barriers, to feed the ore or other solid material directly into the zone of suspension in the several compartments. To this end, as indicated more fully in Figs. 2 and 4, the ore or other material to be leached is fed into compartment #6 through a feed tube 30 opening into that compartment below the level of the grid. The feed tube 30 communicates with the feed hopper 31, which receives the finely-divided ore or other material to be leached; and the feed of the ore from the hopper is effected in any suitable maner, as, for instance, by a piston contained in the cylinder 32, which piston is reciprocated by an eccentric 33, which may be driven by any suitable mechanism, such as that indicated in the drawings, from the source of power.

As shown more fully in Figs. 1, 4 and 5, the source of power may be a driven pulley 34 actuated from a driving belt 35 and mounted upon the transmission shaft 36. The transmission shaft has a series of gears meshing with gears upon the several paddle shafts, the arrangement being such that the several paddle shafts shall rotate in such directions respectively as to progress the ore or the like to be leached through the several compartments in a direction opposite to the direction of flow of the leaching liquid.

Referring again to the capacity of the invention to obtain in the overflow from compartment #6 a saturated solution, I would say that a simple application of the countercurrent principle, is, in so far as my observation has gone, insufficient to deliver a saturated solution from one end of the series of receptacles or compartments and a substantially exhausted solid constituent at the other end of the series. It is, in fact, difficult to bring the solution up to saturation, whereas, it is not nearly as difficult to cause the solids to give up their soluble matter. In other words, time is the all important factor as regards the building up of a saturated solution and is not nearly as important a factor as regards the capacity of the solids to give up their soluble constituents. By means of the present invention, I am enabled to so regulate the relative rate of flow of the solids with respect to the leaching liquid in passing through the series of six compartments, as to take into account these considerations. For instance, the holding capacity of the apparatus is such that it will permit the passing of the solids through the series of six compartments in thirty minutes, and the rate of flow of the leaching liquor can be so regulated and proportioned that it will pass through the six compartments in the opposite direction in say five hours, if the leaching liquor is the mother liquor from a crystallizing operation, or in ten hours if a mother liquor is not employed as the leaching liquor.

It is further to be noted that in the practice of the invention, the amount of power required for the rotation of the paddles is relatively small. Thus, in ordinary practice, the mixture in "the zone of suspension" in any one compartment will consist approximately of one part by weight of solids to 25 parts by weight of liquid. This is so dilute a mixture (i. e., dilute as regards the percentage of solids carried in suspension) that it forms to all intents and purposes what might be called an "emulsion." Under these conditions, the power required is very little more than if the compartment were filled with water. The power consumption increases very rapidly as the mixture becomes heavier, and, as it is obvious that a heavier mixture implies a relatively smaller proportion of leaching liquor, the time factor for the leaching liquor to pass through the apparatus is correspondingly reduced, making it much more difficult to bring it up to saturation.

On reference to Fig. 3, it will be noted that the thickened material discharged by the buckets of each elevator into the next succeeding compartment is partitioned off from the upper or clearer zone of such compartment and finally enters the zone of suspension at a point below the level of the grid or barrier; so that, the solids not only enter the first compartment of the series below the grid in said first compartment, but likewise in passing from one campartment to the other, are conducted into the surfaces below the several grids, thereby insuring the zone of clear solution above the grids from direct contact with the solids.

Having thus described my invention, what I claim is:

1. The method of leaching ores and the like, which comprises feeding the material to be leached through a leaching liquid, maintaining the major part of the material in suspension by vigorous agitation, during its transit through the liquid, and restricting the zone of such suspension by substantially screening it off from the remaining portion of the liquid; substantially as described.

2. The method of leaching ores and the like, which comprises feeding the material to be leached through the lower portion of a leaching liquid, violently agitating it during its passage therethrough and thereby bringing the major portion of the material into suspension, and substantially screening off the zone of suspension from a relatively clear zone of progressively increasing density of solution above; substantially as described.

3. The method of leaching ores and the like, which comprises introducing the material to be leached into the lower portion of the leaching liquid, subjecting the material to agitation so as to bring portions of it into suspension, and substantially screening off the zone of suspension from the relatively clear zone of progressively increasing density of solution above; substantially as described.

4. The method of leaching ores and the like, which comprises establishing a plurality of bodies of leaching liquid, discharging, in continuous flow, the one into the other, feeding the material to be leached in counter direction through said bodies of leaching liquid, agitating said material as it passes through the bodies of leaching liquid so as to bring it in partial suspension therein, and permitting the material to settle after making its exit from one of the bodies of leaching liquid and before entering the next body; substantially as described.

5. The method of leaching ores and the like, which comprises establishing a plurality of bodies of leaching liquid, discharging, in continuous flow, the one into the other, feeding the material to be leached in counter direction through said bodies of leaching liquid, agitating said material as its passes through the bodies of leaching liquid so as to bring it in partial suspension therein, permitting the material to settle after making its exit from one of the bodies of leaching liquid and before entering the next body, and restricting the zone of suspension by substantially screening it from the relatively clear zone of progressively increasing density of solution above; substantially as described.

6. The method of leaching ores and the like, which comprises establishing a body of leaching liquid, separating the said body of leaching liquid into an upper and a lower zone, introducing the material to be leached directly into the lower zone, violently agitating it therein so as to bring portions of it into suspension in said lower zone, and substantially intercepting the suspended solid particles so as to keep the upper zone of the liquid relatively clear; substantially as described.

7. The method of leaching ores and the like, which comprises establishing a body of the leaching liquid, separating the said body of leaching liquid into an upper and a lower zone, introducing the material to be leached directly into the lower zone and feeding it progressively therethrough, violently agitating said material during its transit through said lower zone so as to bring portions of it into suspension in said lower zone, substantially intercepting the suspended solid particles so as to keep the upper zone of the liquid relatively clear, and maintaining an inflow and outflow of the leaching liquid during the operation; substantially as described.

8. In the leaching of ores and the like, feeding the material to be leached through a leaching liquid, violently agitating it during its passage through the leach liquid and thereby maintaining the major portion of it in suspension, and restricting the zone of suspension by intercepting the upward passage of the suspended particles thereby retaining the solids in close contact with the agitating devices and obtaining a relatively clear upper zone of the leaching liquid; substantially as described.

9. The method of leaching ores and the like which comprises, subjecting the material successively to the leaching action of separate bodies of liquid, maintaining suspension of the material in the separate bodies of liquid by vigorous agitation and permitting the material to settle after passing one zone of agitation and before entering the succeeding zone.

In testimony whereof I affix my signature.

JOHN W. HORNSEY.